10 G

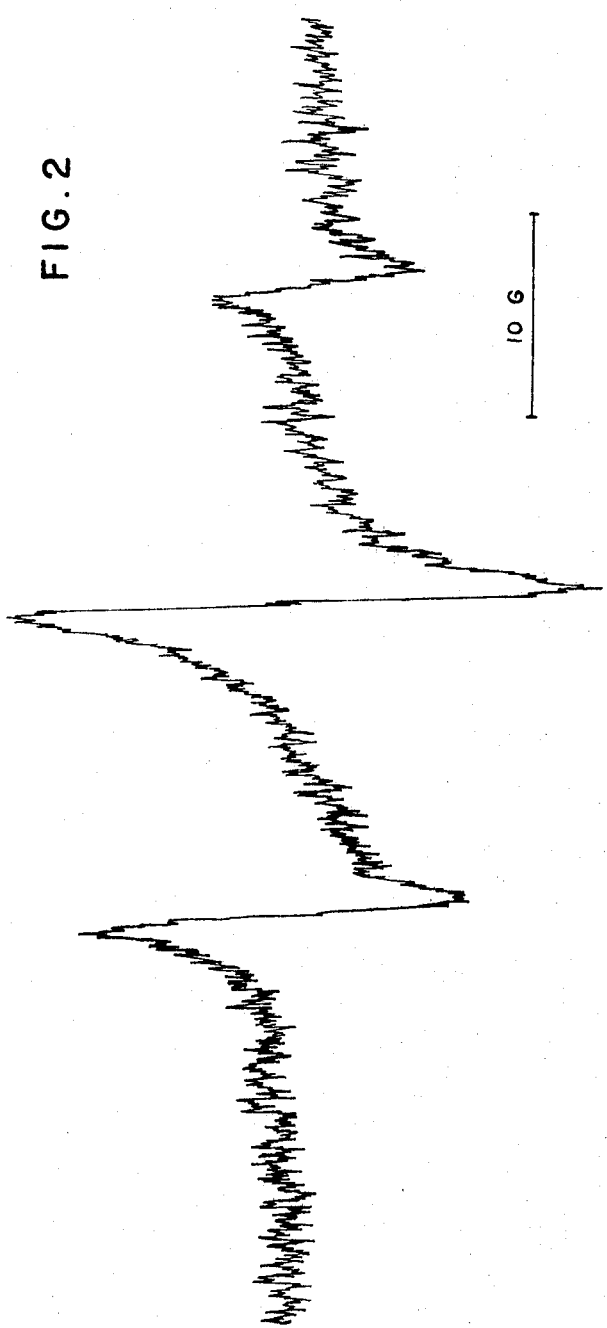

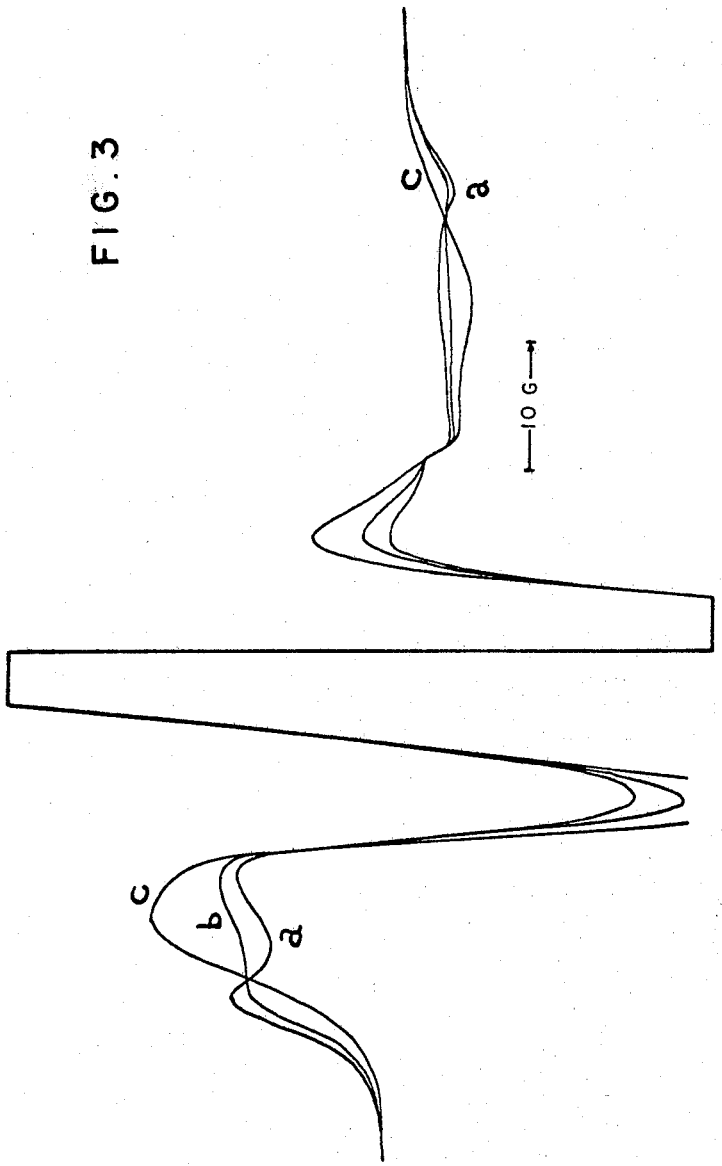

United States Patent Office 3,507,876
Patented Apr. 21, 1970

3,507,876
PYRROLIDINE AND PIPERIDINE NITROXIDE SPIN LABELLING COMPOUNDS
Harden M. McConnell and Seiji Ogawa, Stanford, and Carole L. Hamilton, Los Altos, Calif., assignors to Synvar Associates, Palo Alto, Calif., a partnership
Filed June 9, 1967, Ser. No. 645,023
Int. Cl. C07d 29/30, 27/04
U.S. Cl. 260—294    4 Claims

ABSTRACT OF THE DISCLOSURE

Organic molecules containing a free radical nitroxyl group and having a haloacetamide or haloacetate attaching group for forming a chemical bond with a biologically active molecule, the attaching group being selective for sulfhydryl groups in the biologically active molecule.

Figure 1:
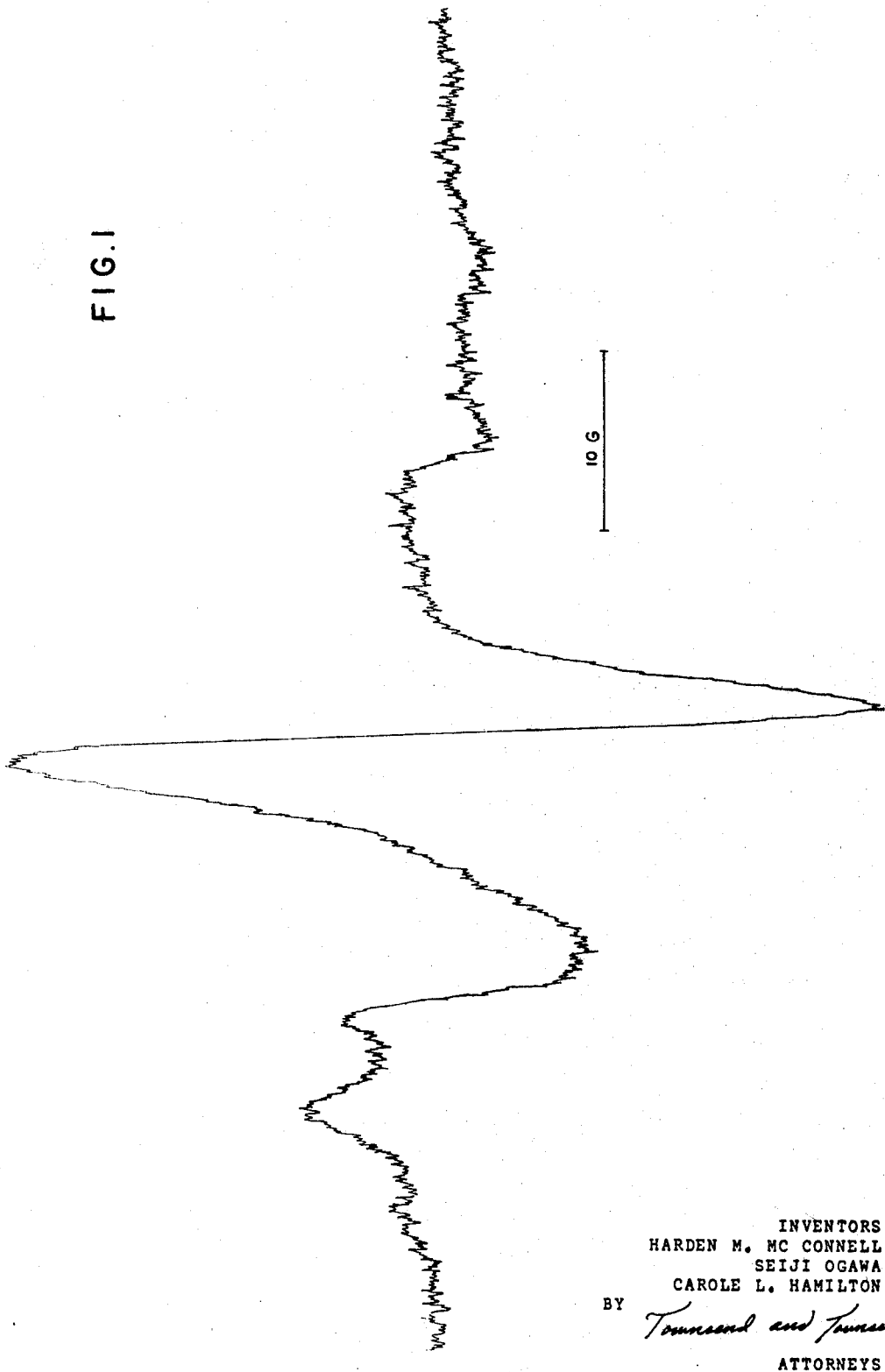

This invention relates to electron spin resonance (ESR) labeling of biologically active molecules. More particularly, it relates to improved organic spin labeling compounds containing the paramagnetic nitroxide group and also containing haloacetamide or haloacetate groups for attaching the spin labeling compound to the biomolecule.

The concept of using synthetic organic ESR labels and the advantages where such labels contain a nitroxide group for generation of paramagnetic resonance, has been described in copending patent applications, Ser. No. 496,682, filed Oct. 15, 1965, now abandoned, and Ser. No. 496,683, filed Oct. 15, 1965, now U.S. 3,453,288. As an improvement, the use of nitroxide molecules containing a maleimide ring as an attaching group for linking the nitroxide molecule to a biomolecule has been described in copending patent application Ser. No. 512,-793, filed Dec. 9, 1965.

The present invention deals with similar nitroxide free radical molecules useful as spin labels and provides new attaching groups for joining the nitroxide molecule to a biomolecule. These new attaching groups may be referred to generally as halosubstituted acetamides and acetates.

In working with nitroxides containing these new attaching groups, a number of significant advantages have been observed. The nitroxide molecule containing the new attaching group is relatively small compared with the molecular size of previously-used labels with the result that the new labels of this invention may be more readily passed through cell membrane walls. Another valuable property is the absence of any charge or polar groups in the molecule so that when the new labels are attached to protein molecules there is substantially no ESR label induced change in the protein molecule from its naturally occurring condition. Perhaps of greatest importance from the standpoint of physical properties is the fact that the new labels are readily soluble in water with obvious advantages when working with physiological solutions and tissues. At the same time, the new molecules are extremely stable in water for many days, which distinguishes them from the relatively unstable label materials that have been available in the past.

In use, the new labels have exhibited certain properties which set them apart and make them particularly interesting and valuable tools in research. The new molecules attach more slowly to the biomolecules to be labeled which facilitates the study of the kinetics of the attachment reaction. Further, the new labels have shown a specificity for the sulfhydryl groups commonly found in protein molecules. As a result, it is new possible to label molecules containing one or more sulfhydryl groups in which substantially all of the label is bonded to the sulfhydryl groups. All of these generally advantageous characteristics of the molecules, and particularly the ability to control the site at which they may react with the biomolecules, renders the new ESR labels of this invention especially advantageous in research on the structure and function of biological macromolecules.

The accompanying drawings show ESR spectra illustrating the specificity of the labels for sulfhydryl groups in a protein molecule (FIGURES 1 and 2) and one type of useful result obtainable with the present labels in connection with the labeling of horse blood hemoglobin (FIGURE 3).

In the preferred embodiment, the new ESR labels of this invention comprise an organic molecule having a free radical nitroxyl group which is preferably stabilized by adjacent tertiary carbon atoms that are bonded directly to the nitrogen of the nitroxyl group. The attaching group is either a halo-substituted acetamide or acetate and may be bonded at any point on the molecule where it will be available for reaction with a suitable site in the biologically active molecule to be labeled. Thus, a class of improved compounds exhibiting ESR and useful for spin labeling in accordance with this invention may be defined as those organic free radicals of the general formula:

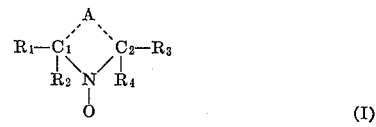

(I)

In the above formula $R_1$, $R_2$, $R_3$, and $R_4$ are alkyl groups preferably unsubstituted and of lower moleculer weight, i.e., about 1–5 carbon atoms. A represents one or two independent organic groups and has a total valency of 2 for bonding to carbon atoms $C_1$ and $C_2$. In either case, the attaching group (2) or (3) of the following structure will be bonded to A to serve as the chemical link between the label molecule and the biomolecule:

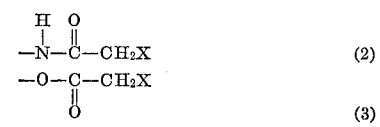

In the formulas for the attaching groups, X is a halogen and is suitably either a bromine or iodine atom.

To date, preferred labels have been made wherein A is an alkylene group so that a heterocyclic ring is formed with $C_1$, $C_2$, and the nitrogen atom of the nitroxide group. Alkylene groups of 2 and 3 carbon atoms have been found to provide successful labels containing 5 and 6-membered heterocyclic rings respectively.

Whereas the preferred compounds contain the heterocyclic ring structure described above, compounds wherein A represents two separate groups are contemplated. Thus, stable molecules reported in the literature have been modified in accordance with this invention to include Y, Y representing either the acetamide or acetate attaching groups discussed above, as described by the following structure

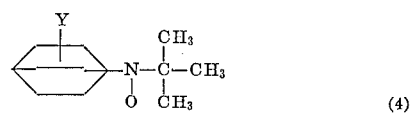

(4)

Note that the two carbon atoms bonded directly to the nitrogen atom are each tertiary in character and have all of their valences satisfied by saturated bonds as is also true of the heterocyclics of Formula 1. Such structures provide the most stable nitroxide free radicals.

The labels may be prepared by straightforward synthetic techniques. For example, a convenient way to prepare the acetamide is by reaction of a nitroxide compound having the desired structure except for the presence of an amino group where the acetamide attaching group is sought. The amine is then reacted with a haloacetic acid in the presence of a condensing agent to form the desired compound in accordance with the following reaction in which the symbol in the brackets represents a group containing a free radical nitroxyl group such as the 5 or 6-membered heterocyclic rings described above and X is bromine or chlorine:

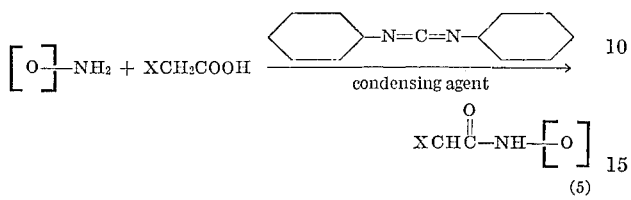
(5)

An alternative is to react the amine with bromoacetyl bromide in the presence of a tertiary amine in accordance with the following equation:

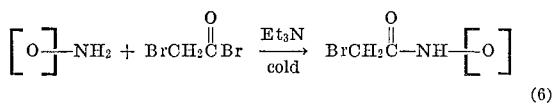
(6)

The bromoacetamide can be converted to the iodo derivative with an alkali metal iodide salt.

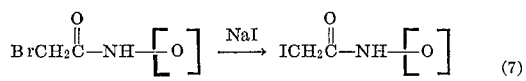
(7)

Another reaction route starts with the halogenated anhydride as follows:

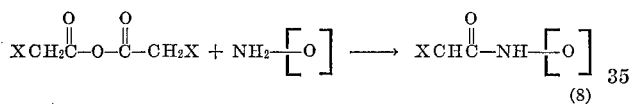
(8)

The acetate derivatives are prepared in the same general way by simply starting with an alcohol instead of an amine. For example, the bromoacetate may be prepared by the following general reaction:

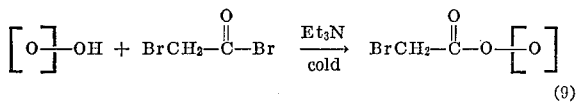
(9)

Again, the bromo derivative can be converted to the iodo form as shown in Equation 7. Analogously to Equation 8, the acetate can be prepared from halogenated acetic anhydride where the alcohol is used instead of the amine.

The following examples illustrate the preparation of several labels within the scope of the invention.

EXAMPLE I

Preparation of N-(1-oxyl-2,2,5,5-tetramethyl-3-pyrrolidinyl) bromoacetamide

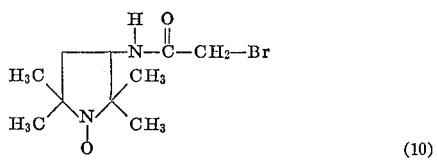
(10)

Equimolar amounts of triethylamine and 2,2,5,5-tetramethyl-3-aminopyrrolidine-1-oxyl were dissolved in dry ether; the solution was cooled to −10° C. in a Dry Ice-acetone bath. An equivalent amount of bromoacetyl bromide was added dropwise, with good stirring. A precipitate formed immediately. When addition of the acid bromide was complete, the system was allowed to warm to room temperature. Then the precipitate was collected by filtration and washed with several portions of ether. The precipitate was then extracted with tetrahydrofuran; the insoluble triethylammonium bromide was removed by filtration. The filtrate was taken to dryness by rotary evaporation, leaving a yellow solid that was recrystallized from tetrahydrofuran-hexane to give M.P. 133–135° (uncorr.).

Analysis.—Calc'd for $C_{10}H_{18}N_2O_2Br$ (percent): C, 43.2; H, 6.5; N, 9.7; Br, 28.8. Found (percent): C, 43.7; H, 6.7; N, 9.4; Br, 27.6.

EXAMPLE II

Preparation of N-(1-oxyl-2,2,5,5-tetramethyl-3-pyrrolidinyl) iodoacetamide

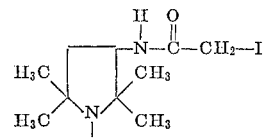
(11)

Sodium iodide (400 mg., 2.67 m.moles) was dissolved in 4 ml. of acetone. A solution of N-(1-oxyl-2,2,5,5-tetramethyl-3-pyrrolidinyl) bromoacetaminde (180 mg., 0.65 m. mole) in 2 ml. of acetone was added gradually, with stirring, whereupon a precipitate began to form. The mixture was stirred at room temperature for three hours, then the solid was collected by filtration. The filtrate was evaporated to dryness under reduced pressure and the resulting solid was extracted with chloroform. The insoluble sodium iodide was removed by filtration. Evaporation of the filtrate left a solid residue that was recrystallized from toluene to give 150 mg. (0.46 m.mole, 71%) of product, M.P. 150° C. (uncorr.).

Analysis—Calc'd for $C_{10}H_{18}N_2O_2I$ (percent): C, 37.0; H, 5.6; N, 8.3; I, 39.1. Found (percent): C, 37.1; H, 5.6; N, 8.6; I, 39.1.

EXAMPLE III

Preparation of N-(1-oxyl-2,2,6,6-tetramethyl-4-piperidinyl) iodoacetamide

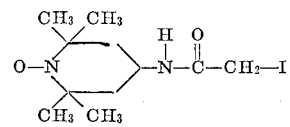
(12)

Iodoacetic acid (0.78 g., 4.2 m.moles), recrystallized before use from benzene-hexane, was dissolved with magnetic stirring in about 25 ml. of ethyl acetate. To this solution was added 0.87 g. (4.2 m.moles) of dicyclohexylcarbodiimide; a precipitate formed immediately. Then 0.72 g. (4.2 m.moles) of 2,2,6,6-tetramethyl-4-aminopiperidine-1-oxyl in a few ml. of ethyl acetate was added dropwise to the stirred mixture. The reaction mixture was shielded from the light and stirred for 4 hrs., then left standing at room temperature for two days.

Dicyclohexylurea was removed from the mixture by filtration. The filtrate was washed with two 15-ml. portions each of 0.1 M hydrochloric acid, 5% sodium bicarbonate and saturated sodium chloride solution. Each aqueous layer in turn was backwashed with ethyl acetate. The combined organic layers were dried over anhydrous magnesium sulfate, then the solvent was removed by rotary evaporation to leave a red oil. Chromatography on neutral alumina, using 3:2 v./v. carbon tetrachloride-ethyl acetate as eluent, followed by evaporation of the solvent, gave pure product that crystallized on standing. The yield was 0.84 g. (59%). The product can be recrystallized in the dark from tetrahydrofuran-hexane to give M.P. 118.5–120.5° (uncorr.); it shows a single spot when chromatographed on Eastman K301R silica gel thin layer sheet with chloroform-ethyl acetate and developed with iodine vapor. The infra-red spectrum of a chloroform solution is almost identical to that of 2,2,6,6-tetramethyl-4-acetamidopiperidine.

The labels of this invention may be used for studying many types of biological molecules, as discussed in the previously cited copending patent applications. However, because it has been found that the present molecules can be controlled to react selectively at only certain sites in proteins, it will be of advantage if the biomolecules chosen for labeling contain sites where this selectivity can be utilized. As noted, the present labels are highly selective for sulfhydryl groups in protein so that it is expected that the label will be used primarily to study structure and behavior of protein and other biological molecules having sulfhydryl groups.

This selectivity for the sulfhydryl group of protein suggests numerous areas for exploitation. For example, since sulfhydryl groups in protein decrease with age, it is now possible to study the structure and behavior of protein and compare changes during the aging process. Another possibility is to use the instant molecules as a label for sulfhydryl groups in blood and to thereafter monitor blood volume during surgery through the ESR spectrum of the label. Another example of the use of the present labels is to study conformational changes in molecules such as the conformational changes in hemoglobin associated with oxygenation. This latter application of the ESR labels will be described in the next example.

EXAMPLE IV

Reaction of labels with horse hemoglobin.

The attachment of the labeling molecule to the molecule to be studied is, in general, executed in a suitable solvent and the pH and reaction time varied to suit the needs of the particular materials under investigation. In the case of a label such as that prepared in accordance with Examples I–III and horse hemoglobin, the attachment has been accomplished as follows:

A two-to ten-fold molar excess of solid N-nitroxyl-haloacetamide is added to a 5–10% solution of horse oxyhemoglobin in 0.1 $M$ phosphate buffer, pH 7.0, at 0° C. The mixture is stirred at 0° C. for the two days, and then unreacted label is removed by passage of the solution through a column of Spehadex G25 (also at 0° C.). After this operation the electron paramagnetic resonance spectrum of the solution may be taken, and is shown in FIGURE 3 of the drawings.

With reference to FIGURE 3, spectrum $a$ was obtained from fully oxygenated horse hemoglobin, $b$ resulted from partially deoxygenated hemoglobin, and $c$ came from fully deoxygenated hemoglobin. Throughout the range of oxygen uptake the spectra obtained behaved as simple superpositions of the traces for oxy- and deoxyhemoglobin and allowed extensive quantitative studies to be made of the relationship between oxygenation and conformational change in that protein. These studies are based upon the principle that the spectra of spin labels attached to large molecules depend upon the local conformation that affects the motion of labels. The spectra of FIGURE 3 are a measure of conformational changes in hemoglobin associated with oxygenation.

The following example is included to illustrate the specificity of the new labels for reaction with sulfhydryl groups.

EXAMPLE V

Aldolase was treated overnight at 0° C. in 0.1 M phos-pH 6.8 buffer with N-(1-oxyl-2,2,5,5-tetramethyl-3-pyrrolidinyl) bromoacetamide. The ESR spectrum was then taken and is shown in FIGURE 1.

For comparison, the sulfhydryl groups in aldolase were first blocked with paramercuribenzoate and the aldolase was then reacted with the label solution in the same manner. The ESR spectrum was then taken and is shown in FIGURE 2.

Only a weakly immobilized label results where the sulfhydryl groups are blocked as seen in FIGURE 2. These results lead to the conclusion that the strongly immobilized component in the spectrum of FIGURE 1 is due to the label that has been attached to cysteine. From intensity ratios, it can be estimated that about 90% of the label is bonded to the cysteine.

Although the new labels are highly specific for sulhydryl groups as shown by suitable control over conditions, reaction at other sites and with other types of molecules is possible. For example, it has been found that the new labels can be reacted to attach to methionine, although the degree of specificity is not as great as that in connection with sulfhydryl groups. Similarly, less specificity has been found where the new molecules have been used to label nucleic acids.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A free radical organic molecule for spin labeling biologically active molecules and having the formula:

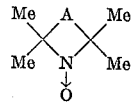

wherein A represents ethylene or propylene having a substituent selected from the groups consisting of

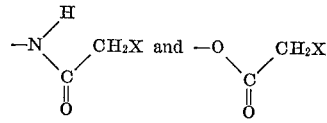

in which X represents bromine or iodine.

2. The free radical organic molecule useful as a spin label N-(1-oxyl-2,2,5,5-tetramethyl-3-pyrrolidinyl)bromoacetamide.

3. The free radical organic molecule useful as a spin label N - (1-oxyl-2,2,5,5-tetramethyl-3-pyrrolidinyl)iodoacetamide.

4. The free radical organic molecule useful as a spin label N - (1 - oxyl - 2,2,6,6 - tetramethyl-4-piperidinyl) iodoacetamide.

References Cited

UNITED STATES PATENTS

| 3,163,677 | 12/1964 | Hoffman et al. | 260—583 |
| 3,253,015 | 5/1966 | Hoffman et al. | 260—465.5 |
| 3,334,103 | 8/1967 | Feldman et al. | 260—290 |

OTHER REFERENCES

Konovalova et al., Akademic Nauk SSSR Doklady, 157(3), 707–9 (1964).

Stone et al., Proc. Natl. Acad. Sci. U.S. 54(4), 1010–17 (1965); C.A. 64, 5335e (1966).

Rozantzen et al., Tetrahedron 20, 131–7 (1964).

HENRY R. JILES, Primary Examiner

G. T. TODD, Assistant Examiner

U.S. Cl. X.R.

23—230; 260—112, 112.5, 121; 424—2